(12) United States Patent
Kishore et al.

(10) Patent No.: US 8,588,297 B2
(45) Date of Patent: Nov. 19, 2013

(54) QUANTIZATION PARAMETER PREDICTION

(75) Inventors: Kelly Yoshikazu Kishore, San Jose, CA (US); Gerard Marius Xavier Fernando, Mountain View, CA (US); Michael Allen DeMoney, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 960 days.

(21) Appl. No.: 12/646,707

(22) Filed: Dec. 23, 2009

(65) Prior Publication Data
US 2011/0150077 A1 Jun. 23, 2011

(51) Int. Cl.
*H04N 11/02* (2006.01)
(52) U.S. Cl.
USPC ............ 375/240.03; 375/240.14; 375/240.16; 375/240.25; 382/232; 382/233
(58) Field of Classification Search
USPC .......................................... 375/240; 382/232
See application file for complete search history.

(56) References Cited

U.S. PATENT DOCUMENTS

| 5,995,148 A | * | 11/1999 | Haskell et al. | 375/240.04 |
| 6,005,626 A | | 12/1999 | Ding | |
| 6,654,418 B2 | * | 11/2003 | Haskell et al. | 375/240.03 |
| 2003/0031128 A1 | * | 2/2003 | Kim et al. | 370/229 |
| 2006/0245496 A1 | * | 11/2006 | Chen | 375/240.16 |
| 2008/0304562 A1 | * | 12/2008 | Chang et al. | 375/240.03 |
| 2009/0213930 A1 | * | 8/2009 | Ye et al. | 375/240.03 |

* cited by examiner

*Primary Examiner* — William C Vaughn, Jr.
*Assistant Examiner* — Luis M Perez
(74) *Attorney, Agent, or Firm* — Osha Liang LLP

(57) ABSTRACT

A method for encoding a video frame. The method including obtaining a current frame from a video stream, where the video stream includes a number of frames, determining a first base QP value for the current frame, and sending the first base QP value for the current frame to a decoder. The method also includes obtaining a first macroblock from the current frame, where the first macroblock includes a first image on the current frame, determining a first actual quantization parameter (QP) value for the first macroblock, and determining a first reference block for the first macroblock. The method also includes determining a first predicted QP value for the first macroblock using the first reference block, calculating a first ΔQP value for the first macroblock, and sending the first ΔQP value, a first prediction mode, and a first reference vector to the decoder.

20 Claims, 11 Drawing Sheets

QUANTIZATION PARAMETER PREDICTION

BACKGROUND

Media, such as video media, is transmitted, both in fixed quantities of data and in streams of data. Because of the size of the data being transmitted, different methods are used to efficiently transmit the data. One method is encoding the data at its source, transmitting the encoded data, and decoding the compressed data at the receiving end. Data encoding may be beneficial because it may require less bandwidth for transmission, which reduces the cost of transmitting the data and makes the transmission of the data more efficient. On the other hand, data encoding runs a risk of reducing the quality of the data once it is decoded. When data is encoded, some of the data may be lost and may not be recovered during decoding.

Within the field of data encoding and decoding, different methods exist. One method creates one or more quantization parameters (QPs) for a video frame and uses the QPs as the basis for encoding and later decoding the data. Such prediction methods are used in an attempt to further reduce bandwidth. Different QP prediction methods exist, and each must balance the bandwidth consumed by the encoded data and the quality of the complexity of the algorithm.

SUMMARY

One or more embodiments of the invention relate to a computer readable medium including instructions executable by a processor to perform a method. The method includes obtaining a current frame from a video stream, where the video stream includes a number of frames and determining a first base QP value for the current frame. The method also includes sending the first base QP value for the current frame to a decoder and obtaining a first macroblock from the current frame, where the first macroblock includes a first image on the current frame. The method further includes determining a first actual quantization parameter (QP) value for the first macroblock and determining a first reference block for the first macroblock. The method also includes determining a first predicted QP value for the first macroblock using the first reference block and calculating a first ΔQP value for the first macroblock as a difference between the first actual QP value and the first predicted QP value. The method further includes sending the first ΔQP value, a first prediction mode, and a first reference vector to the decoder, where the first prediction mode indicates a frame of the number of frames on which the first reference block resides, and where the first reference vector discloses a location of the first reference block on the frame.

One or more embodiments of the invention relate to a computer readable medium including instructions executable by a processor to perform a method. The method includes receiving a base quantization parameter (QP) value for a video frame from an encoder and receiving a first ΔQP value, a first prediction mode, and a first reference vector for a first macroblock, where the first macroblock includes an image on the video frame, where the first prediction mode indicates a video frame on which the first reference block resides, and where the first reference vector discloses a location of the first reference block on the video frame on which the reference block resides. The method also includes determining a first reference block using the first reference vector and the first prediction mode for the first macroblock and generating a reconstructed first predicted QP value for the first macroblock using the first prediction mode, the first reference block, and the base QP value for the video frame. The method further includes calculating a reconstructed first actual QP value for the first macroblock by adding the reconstructed first predicted QP value and the first ΔQP value and generating a reconstructed video frame based on the reconstructed first actual QP value. The method further includes sending the reconstructed video frame to a media receiver.

One or more embodiments of the invention relate to a system. The system includes a processor and memory. The system also includes a video source configured to send a first video frame and a second video frame to an encoder using the processor. The system further includes an encoder configured to execute, using the processor, software instructions stored in the memory, to receive the first video frame and the second video frame, determine a base quantization parameter (QP) value for the first video frame, and obtain a first number of macroblocks for the first video frame. The encoder is further configured to execute, using the processor, software instructions stored in the memory, to determine a first actual QP value for a first macroblock of the first number of macroblocks, determine a first reference block for the first macroblock, and calculate a first ΔQP value for the first macroblock. The system further includes a QP encoder prediction engine configured to execute, using the processor, software instructions stored in the memory, to receive the first reference block, a first prediction mode, and the first base QP value for the first video frame, and where the first prediction mode indicates a frame on which the first reference block resides. The QP encoder prediction engine is further configured to execute, using the processor, software instructions stored in the memory, to calculate a first predicted QP value for the first macroblock using the first reference block, the first prediction mode, and the first base QP value, where the first predicted QP value is subtracted from the first actual QP value to generate the first ΔQP value for the first macroblock.

Other aspects of the invention will be apparent from the following description and the appended claims.

DETAILED DESCRIPTION

Figure 1:
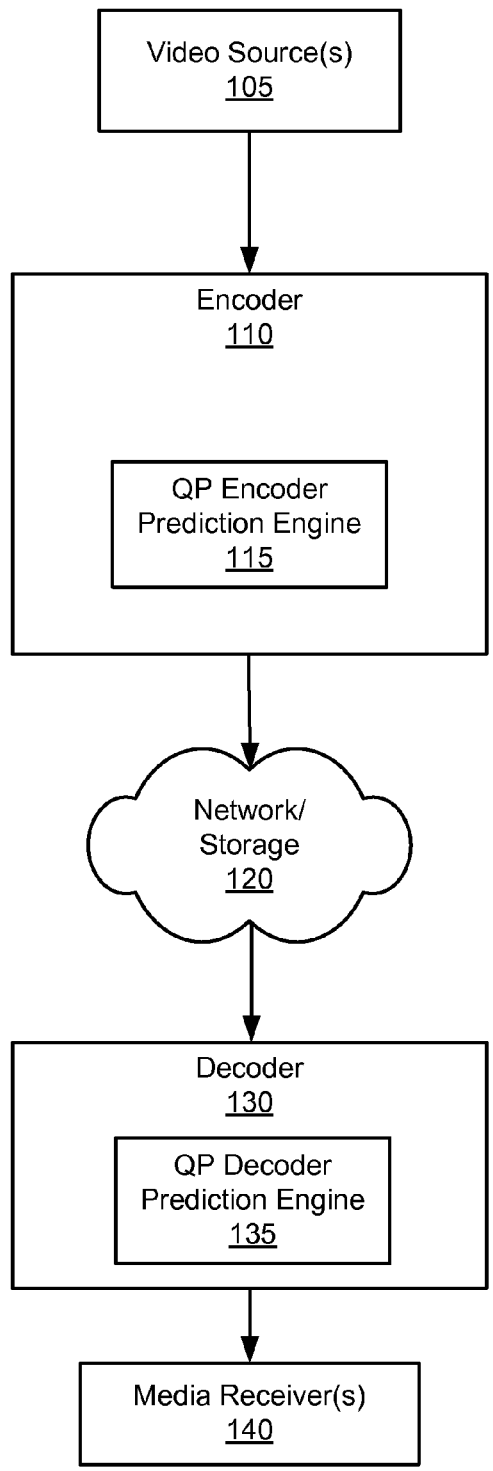
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for quantization parameter (QP) prediction. More specifically, one or more embodiments of the invention provide a method and system, as part of the encoding process, for predicting quantization parameters using reference blocks both within a frame and from a previous frame. Further, one or more embodiments of the invention provide a method and system, as part of the decoding process, for using the predicted quantization parameters.

In one embodiment of the invention, the quantization parameter (QP) regulates how much spatial detail is saved during encoding. When the QP is very small, almost all that detail is retained. As the QP is increased, some of the detail is aggregated such that the amount of bits required to encode the video frame decreases. In particular, data encoding results in the generation of residuals, which correspond to the difference between the video source and result after decoding the encoded video (also referred to as the prediction error). In order to convey "residuals" to the decoder, a spatial transform is applied to the residual to produce transformed coefficients that carry any spatial detail that is not captured in the prediction itself or its reference pictures.

More specifically, the residual is transformed into the spatial frequency domain by an integer transform that approximates the Discrete Cosine Transform (DCT). The QP determines the step size for associating the transformed coefficients with a finite set of steps. Large values of QP represent big steps that crudely approximate the spatial transform, so that most of the signal can be captured by only a few coefficients. Small values of QP more accurately approximate the block's spatial frequency spectrum, but at the cost of more bits.

FIG. 1 shows a diagram of a system in accordance with one or more embodiments of the invention. The system includes a video source(s) (105), an encoder (110), a network/storage (120), a decoder (130), and a media receiver(s) (140). The encoder (110) includes a QP encoder prediction engine (115). The decoder (130) includes a QP decoder prediction engine (135). Each of these components is described below. One of ordinary skill in the art will appreciate that embodiments of the invention are not limited to the configuration shown in FIG. 1.

In one or more embodiments of the invention, the video source(s) (105) is configured to communicate with the media receiver(s) (140) using the network and/or storage (denoted as Network/Storage) (120). The video source(s) (105) may be any source of data, where the data may include but is not limited to video data, audio data, control data, content security data, some other source of data, or any combination thereof. Examples of a video source (105) may include, but are not limited to, a television station, a video camera, a video recorder, and a multi-media repository storing multi-media files. Examples of a network (120) include, but are not limited to, a local area network (LAN), a wide area network (WAN) such as the Internet, satellite, or any other similar type of network. The storage (120) may also be a type of tangible computer readable medium such as a digital video disk (DVD), a compact disc (CD), a diskette, a tape, a memory stick such as a jump drive or a flash memory drive, or any other computer or machine readable storage medium. In one or more embodiments of the invention, the network/storage (120) is accessed via a connection port on the video source(s) (105), into which the media receiver(s) (140) connect to communicate with the video source(s) (105). Those skilled in the art will appreciate that the network/storage (120) may include a combination of network(s) and/or storage devices. Further, those skilled in the art will appreciate that the compressed data may be stored on a tangible medium such as a DVD, flash drive, or any other medium capable of storing compressed data and be physically transported to a location that includes an appropriate media receiver for obtaining the compressed data from the medium and decompressing the data.

In one or more embodiments of the invention, the video source(s) (105) is configured to host the encoder (110). Alternatively, the encoder (110) may be operatively connected as a device external to the video source(s) (105). The encoder (110) is configured to compress the data before the data is transmitted to the media receiver(s) (140) through the network/storage (120).

In one or more embodiments of the invention, the media receiver(s) (140) are configured to communicate with the network/storage (120). The media receiver(s) (140) may be any device capable of receiving the data from the data source(s) (105). Examples of a media receiver (140) include, but are not limited to, a television set, a DVD player, a Blu-Ray Disc® Player, a satellite receiver, and a computer. (Blu-Ray® is a registered trademark of the Blu-Ray Disc Association, California). In one embodiment of the invention, the media receiver (140) is also configured to host the decoder (130). Alternatively, the decoder (130) may be operatively connected as a device external to the media receiver(s) (140). The decoder (130) is configured to decompress the compressed data after receiving the compressed data transmitted by the video source(s) (105) through the network/storage (120). Those skilled in the art will appreciate that a single computer system may include both a video source (105) and a media receiver (140). Such a single computer system may also include an encoder (110) and a decoder (130).

In one or more embodiments of the invention, the encoder (110) includes a data interface (not shown), memory (not shown), a processor (not shown), and a QP encoder prediction engine (115). The data interface of the encoder (110) may be configured to receive data from the video source(s) (110) and send data to the decoder (130) through the network/storage (120). In one or more embodiments of the invention, the processor of the encoder (110) is configured to execute software instructions configured to perform various functionalities of one or more embodiments of the invention discussed below.

In one or more embodiments of the invention, the memory of the encoder (110) is configured to store software instructions as well as data received from the video source(s) (105). The memory of the encoder (110) may be flash memory, a hard disk drive (HDD), random access memory (RAM), read-only memory (ROM), any other type of suitable storage space, or any combination thereof. Alternatively, the aforementioned software instructions may be stored on any tangible computer readable medium such as a compact disc (CD), a diskette, a tape, a memory stick such as a jump drive or a flash memory drive, or any other computer or machine readable storage device external to the encoder (110), which may be accessed and executed by the processor of the encoder (110).

In one or more embodiments of the invention, the encoder (110) may perform a number of functions to encode data. Specifically, the encoder (110) may be configured to perform a number of functions described in FIGS. 2 and 4-9B below. Specifically, for example, the encoder (110) may be configured to obtain a video frame, send the base QP value to the decoder (130), obtain a number of macroblocks for the video frame, initiate and increment a counter, determine an actual QP value for each macroblock in the video frame, determine a reference block, if any, for each macroblock in the video frame, calculate a $\Delta QP$ value for each macroblock in the video frame, send the $\Delta QP$ value, prediction mode, and reference vector for each macroblock in the video frame to the decoder (130), and/or compare the number in the counter with the number of macroblocks in the video frame. Those skilled in the art will appreciate that the encoder (110) may perform other functions, not expressly listed herein, to enable this invention.

The encoder (110) may also determine a base QP value for the video frame, where the base QP value is an overall average of an entire video frame. In determining the base QP value, the overall average of the entire video frame may involve all macroblocks in a video frame or only a portion of macroblocks in the video frame. The overall average may be a simple average of the actual QP values of the macroblocks within the video frame under consideration. Other methods may also be used to determine the overall average, such as a mean value, a most common value, or some other suitable method. Likewise, if not all macroblocks in a video frame are not considered in determining the base QP value, various methods may be used to determine which macroblocks to use.

In one or more embodiments of the invention, the encoder (110) may also determine a reference block for a macroblock. A reference block may include an image similar to the image contained within the macroblock. A reference block may be determined using one or more block matching algorithms known in the art (examples of block matching algorithms are provided below).

In one or more embodiments of the invention, the encoder (110) may also select a prediction mode for a macroblock. The prediction mode identifies a frame on which a reference block (if any) resides with regard to a macroblock. For example, a prediction mode may be spatial, which indicates that the reference block resides on the same video frame as the macroblock. The prediction mode may also be motion (also referred to a temporal), which indicates that the reference block resides on a different video frame than the video frame on which the macroblock resides. For example, in a motion prediction mode, the video frame on which the reference block resides may be immediately preceding the video frame on which the macroblock resides. The video frame on which the reference block resides may also be any other video frame from the video stream, which includes the video frame on which the macroblock resides. More than one prediction mode may be used on a single macroblock, where a determination is made as to which prediction mode to use after the predicted QP value using each prediction mode is evaluated. Use of a particular prediction mode may be part of a regular pattern or based on randomness.

In one or more embodiments of the invention, the encoder (110) may also determine a reference vector. A reference vector provides a mapping between the macroblock and the reference block for purposes of encoding and decoding. Said another way, a reference vector uses the information obtained from the existence and location of a reference block along with the information obtained from the prediction mode. In cases where no reference block exists, the reference vector may be a null value, or a reference vector may not be determined.

In one or more embodiments of the invention, the encoder (110) may also be configured to calculate a weighted average value. The calculation of a weighted average value may be required to determine, as described below, a QP value for the reference block when the reference block overlaps more than one macroblock. The weighting of the calculation may be based on a number of factors, including but not limited to, a number of pixels in each macroblock that intersects the reference block.

In one or more embodiments of the invention, the encoder (110) may also be configured to calculate an offset. An offset may be used with a motion prediction mode to account for a change in the base QP value of a current frame and the base QP value of a frame containing the reference block. In one of more embodiments of the invention, the offset is calculated as the difference between the base QP value of a current frame and the base QP value of a frame including the reference block. The offset may also be calculated or determined in any other suitable manner. In spatial prediction mode cases, the offset may be equal to zero.

In one or more embodiments of the invention, the QP encoder prediction engine (115) of the encoder (110) is configured to determine a predicted QP value for a macroblock. The predicted QP value for a macroblock is used with the actual QP value for the macroblock to determine the ΔQP value for the macroblock. The QP encoder prediction engine (115) may use the reference block and prediction mode for the macroblock, as well as the base QP value for the video frame, to determine the predicted QP value for the macroblock. In one or more embodiments of the invention, the QP encoder prediction engine (115) may also perform one or more of the above-listed functions performed by the encoder (110), including but not limited to, the calculation of the ΔQP value for the macroblock. The QP encoder prediction engine (115) may also be configured to receive information necessary to perform its function(s) from the encoder (110). For example, the QP encoder prediction engine (115) may be configured to receive the base QP value for a video frame, the reference block and prediction mode for a macroblock, and any other information required to calculate the predicted QP value for the macroblock. Further, the QP encoder prediction engine (115) may be configured to send information, including but not limited to the predicted QP value for the macroblock, to the encoder (110).

In one or more embodiments of the invention, the encoder (110) is configured to host the QP encoder prediction engine (115). Alternatively, the QP encoder prediction engine (115) may be operatively connected as a device external to the encoder (110).

In one or more embodiments of the invention, the decoder (130) includes a data interface (not shown), memory (not shown), a processor (not shown), and a QP decoder prediction engine (135). The data interface may be configured to receive data from the encoder (110) through the network/storage (120) and send data to the media receiver(s) (140). In one or more embodiments of the invention, the processor of the decoder (130) is configured to execute software instructions configured to perform various functionalities of one or more embodiments of the invention discussed below.

In one or more embodiments of the invention, the memory of the decoder (130) is configured to store software instructions as well as data to be sent to the media receiver(s) (140). The memory of the decoder (130) may be flash memory, a hard disk drive (HDD), random access memory (RAM), read-only memory (ROM), any other type of suitable storage space, or any combination thereof. In addition, the memory of the decoder (130) may store the aforementioned software instructions. Alternatively, software instructions to perform embodiments of the invention may be stored on any tangible computer readable medium such as a compact disc (CD), a diskette, a tape, a memory stick such as a jump drive or a flash memory drive, or any other computer or machine readable storage device external to the decoder (130), which may be accessed and executed by the processor of the decoder (130).

In one or more embodiments of the invention, the decoder (130) may perform a number of functions to decode data. Specifically, the decoder (130) may be configured to perform a number of functions described in FIGS. 3 and 4-9B below. Specifically, for example, the decoder (130) may be configured to receive the base QP value for a video frame from the encoder (110), receive the ΔQP value, prediction mode, and reference vector for a macroblock in the video frame from the encoder (110), determine a reference block, if any, using the reference vector and prediction mode for a macroblock, calculate a reconstructed actual QP value for the macroblock by adding a reconstructed predicted QP value (described below) and the ΔQP value, generate a reconstructed video frame based on the reconstructed actual QP value, send the reconstructed video frame to a media receiver (140), initiate and increment a counter, and/or compare the number in the counter with the number of macroblocks in the video frame. Those skilled in the art will appreciate that the decoder (130) may perform other functions, not expressly listed herein, to enable this invention.

In one of more embodiments of the invention, the QP decoder prediction engine (135) of the decoder (130) is configured to determine a reconstructed predicted QP value for a macroblock. The reconstructed predicted QP value for a macroblock is used with the ΔQP value for the macroblock to determine the reconstructed actual QP value for the macroblock. The QP decoder prediction engine (135) may use the reference block and prediction mode for the macroblock, as well as the base QP value for the video frame, to determine the reconstructed predicted QP value for the macroblock. In one or more embodiments of the invention, the QP decoder prediction engine (135) may also perform one or more of the above-listed functions performed by the decoder (130), including but not limited to the calculation of the reconstructed actual QP value for the macroblock. The QP decoder prediction engine (135) may also be configured to receive information necessary to perform its function(s) from the decoder (130). For example, the QP decoder prediction engine (135) may be configured to receive the base QP value for a video frame, the reference block and prediction mode for a macroblock, and any other information needed to calculate the reconstructed predicted QP value for the macroblock. Further, the QP decoder prediction engine (135) may be configured to send information, including but not limited to the reconstructed predicted QP value for the macroblock, to the decoder (130).

In one or more embodiments of the invention, the decoder (130) is configured to host the QP decoder prediction engine (135). Alternatively, the QP decoder prediction engine (135) may be operatively connected as a device external to the decoder (130).

Figure 2:
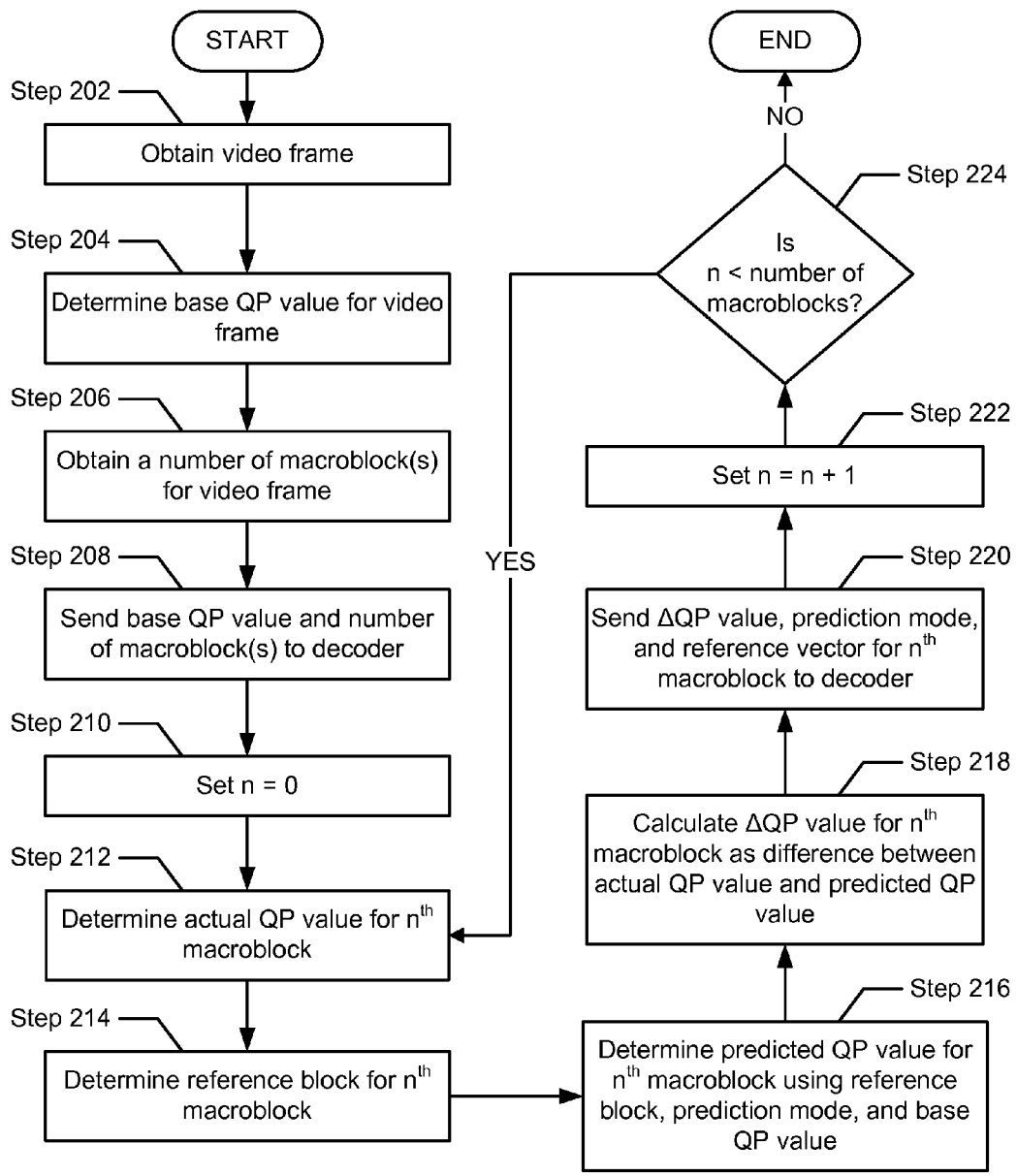
FIGS. 2-4 show flowcharts of methods in accordance with one or more embodiments of the invention.
Figure 3:
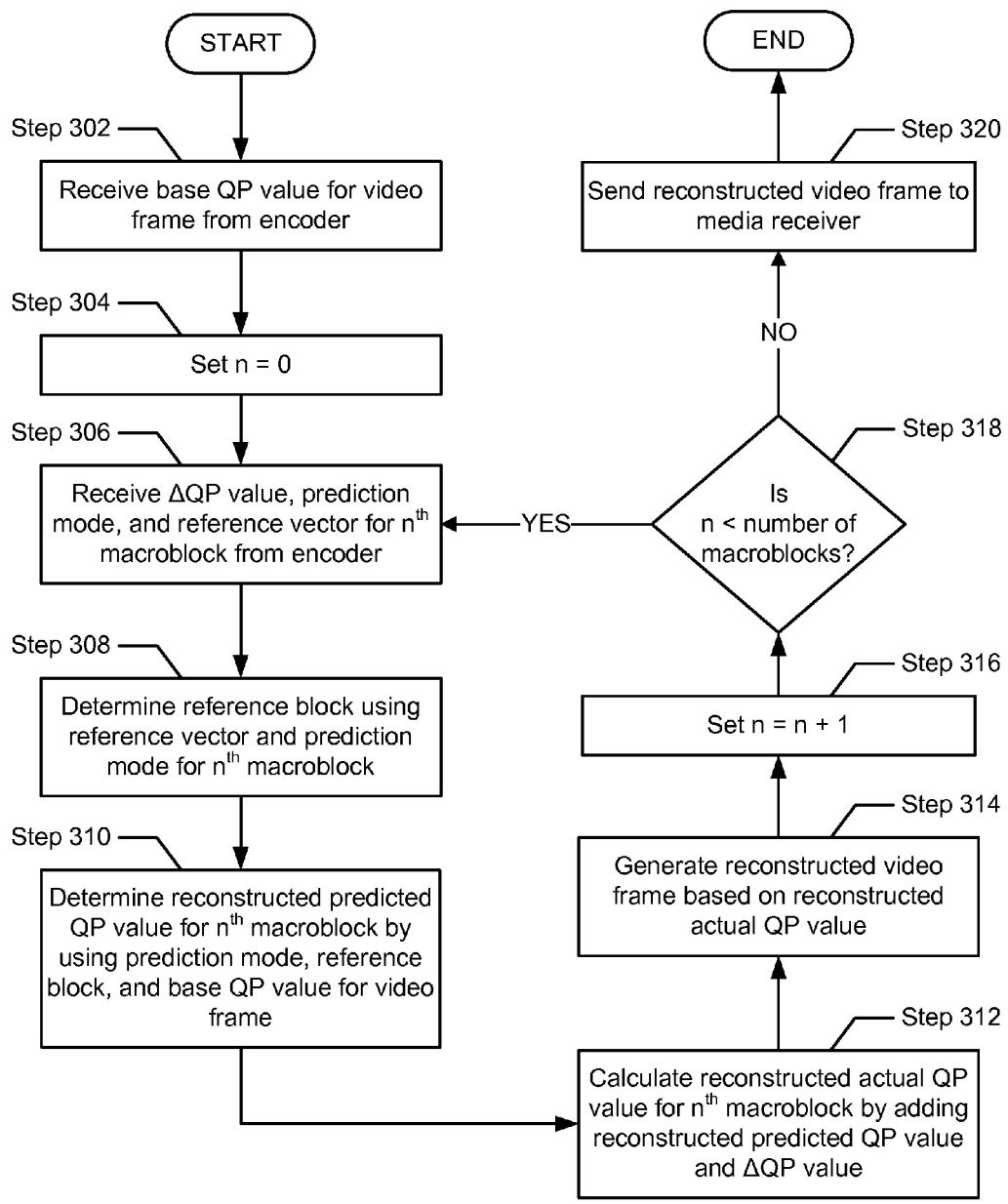

FIGS. 2 and 3 each show a flowchart of a method of using predicted QP values based on a reference block in accordance with one or more embodiments of the invention. FIG. 2 applies the described method to an encoding process, and FIG. 3 applies the described method to a decoding process. The method described in FIGS. 2 and 3 each applies to a number of macroblocks in a single video frame. Those skilled in the art will appreciate that the process may be repeated for multiple video frames, such as, for example, for each video frame within a video stream. A purpose of the decoder and the method described in FIG. 3 is to reconstruct the video frame using the data (as described in FIG. 2) sent by the encoder. While the various steps in this flowchart are presented and described sequentially, one of ordinary skill will appreciate that some or all of the steps may be executed in different orders, may be combined, or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIGS. 2 and 3, may be included in performing this method for encoding and/or decoding data. Accordingly, the specific arrangement of steps shown in FIGS. 2 and 3 should not be construed as limiting the scope of the invention. Further, in one or more embodiments of the invention, a particular computing device, as described, for example, in FIG. 10 below, is used to perform one or more of the steps in FIGS. 2 and 3.

Referring to FIG. 2, in Step 202, a video frame is obtained. The video frame may be a single frame or one of a finite set of video frames. Alternatively, the video frame may be one of a continuous stream of video frames. The video frame may also be a first frame after a stream of video frames has been interrupted. The video frame may include any type of data (as discussed above).

In Step 204, a base QP value for the video frame is determined. As described above, the base QP value represents a value for the entire video frame. The base QP value may be determined before the video frame is divided into macroblocks or after the video frame is divided into macroblocks.

In Step 206, a number of macroblocks for the video frame is obtained. In one or more embodiments of the invention, a macroblock represents a region of pixels within the video frame. The number of pixels in a macroblock may be in a square matrix, such as 64 pixels in an 8×8 matrix. The number of pixels in a macroblock may be in a rectangular matrix, such as 32 pixels in an 8×4 matrix. In one or more embodiments of the invention, the number of macroblocks for the video frame is in a square matrix, such as one macroblock in a 1×1 matrix or 16 macroblocks in a 4×4 matrix. The number of macroblocks for the video frame may also be in a rectangular matrix, such as eight macroblocks in a 2×4 matrix or 15 macroblocks in a 5×3 matrix. Those skilled in the art will appreciate that other configurations may exist with regard to pixels in a macroblock and/or macroblocks in a video frame.

In Step 208, the base QP value and the number of macroblocks are sent to a decoder. In step 210, n is set to equal zero. In one or more embodiments of the invention, n represents a counter in integer format. The counter may represent a number assigned to a macroblock within a video frame. When n=0, the counter may be initialized.

In step 212, the QP value for the $n^{th}$ macroblock is determined. The QP value may be an integer or a real number. The QP value may also be rounded or truncated to comply with an integer format. In step 214, a reference block for the $n^{th}$ macroblock is determined. In one or more embodiments of the invention, the contents of the reference block are determined to be similar to the contents of the $n^{th}$ macroblock. For example, the reference block may contain a similar image, have a similar background, or be deemed similar by some other criteria. Those skilled in the art will appreciate that one or more block matching algorithms (BMAs) may be used to determine the reference block for the $n^{th}$ macroblock. BMAs are designed to locate matching macroblocks in a sequence of video frames to estimate motion of an object in the video frames. Examples of BMAs include, but are not limited to, exhaustive search, cross search algorithm, full search algorithm, spiral search, three step search, four step search, two-dimensional logarithmic search, one-at-a-time algorithm, binary search, orthogonal search algorithm, hierarchical search algorithm, adaptive rood pattern search, and diamond search.

Continuing with step 214, in one or more embodiments, the reference block is the same size as the $n^{th}$ macroblock. The reference block may be the $n^{th}$ macroblock, a different macroblock in the same video frame, or a macroblock in a different video frame, where the different video frame may be a previous video frame. The reference block may also overlap two or more macroblocks. Optionally, in one or more embodiments of the invention, the reference block for the $n^{th}$ macroblock may not exist, in which case the process proceeds to step 216.

Figure 4:
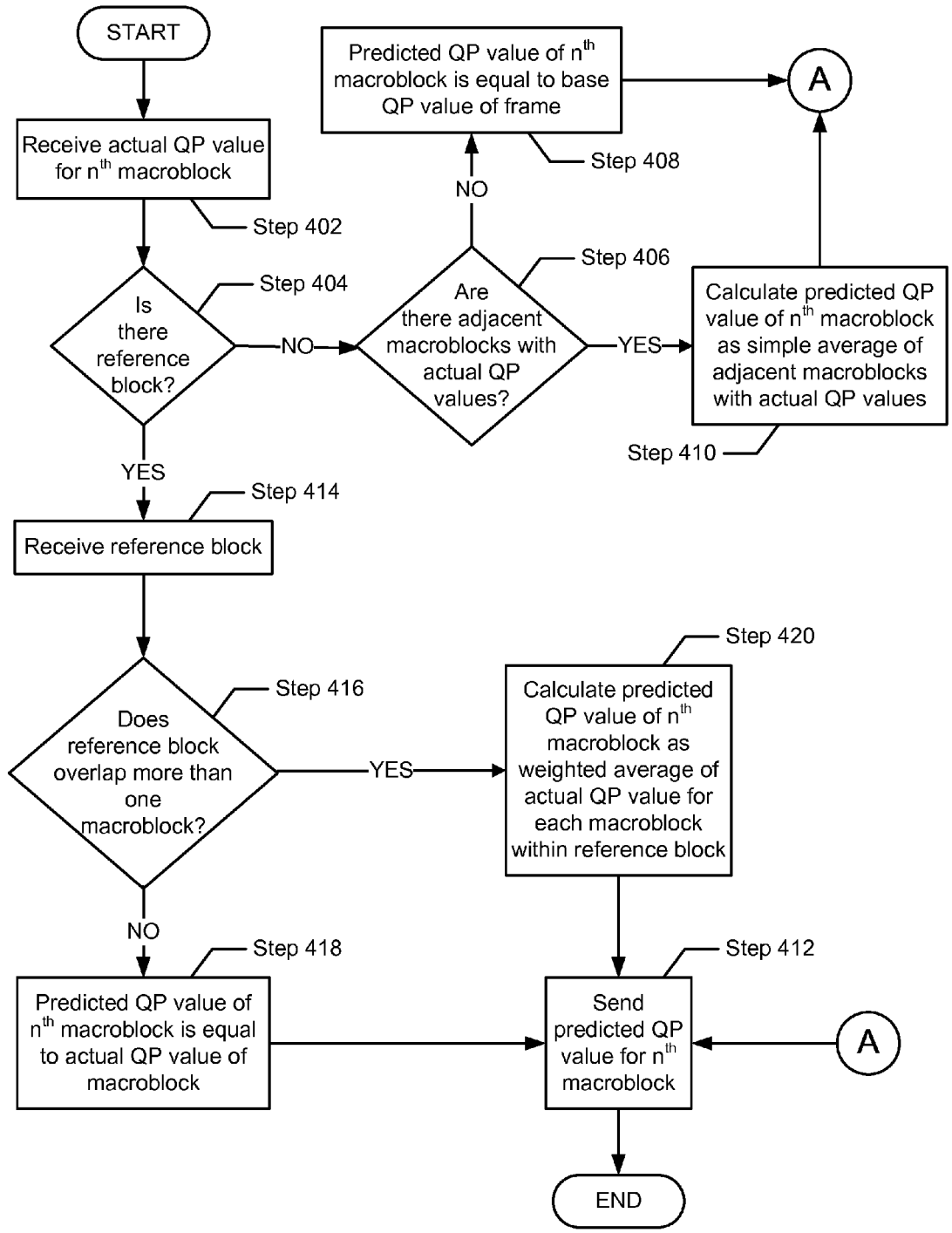

In step 216, a predicted QP value is determined for the $n^{th}$ macroblock using the reference block, the base QP value, and a prediction mode. The base QP value may be the same as the base QP value discussed in step 204, and the reference block may be the same as the reference block discussed in step 214. In one or more embodiments of the invention, the prediction mode indicates the video frame on which the reference block resides. Specifically, the prediction mode may indicate that the reference block is on the same video frame as the $n^{th}$ macroblock. The prediction mode may also indicate that the reference block resides on the previous video frame relative to the video frame on which the $n^{th}$ macroblock resides. In one or more embodiments of the invention, if no reference block exists, as discussed with respect to step 214, then the prediction mode specifies that the predicted QP value of the $n^{th}$ macroblock is equal to the actual QP value of the $n^{th}$ macroblock. An offset (discussed above) may optionally be used in determining the predicted QP value for the $n^{th}$ macroblock. FIG. 4 below provides additional details regarding the determination of the predicted QP value.

In step 218, a ΔQP value for the $n^{th}$ macroblock is calculated as the difference between the actual QP value (obtained in step 212) and the predicted QP value (obtained in step 216) of the $n^{th}$ macroblock. The ΔQP value may be an integer or a real number. The ΔQP value may also be rounded or truncated to comply with an integer format.

In step 220, the ΔQP value, prediction mode, and reference vector for the $n^{th}$ macroblock is sent to the decoder. In one or more embodiments of the invention, the reference vector points to the video frame and macroblock where the reference block, if any, resides. If there is no reference block, then the reference vector is zero (e.g., the reference vector points to the current macroblock of the current video frame).

In step 222, n is set to equal n+1. In other words, the counter described above with respect to step 210 in incremented by one. In step 224, a determination is made as to whether n is less than the number of macroblocks in the video frame, as described above with respect to step 208. If n is less than the number of macroblocks in the video frame, then the process reverts to step 212, where the actual value of the $n^{th}$ macroblock is determined. If n is not less than (i.e., n equals or exceeds) the number of macroblocks in the video frame, then the process ends for the current video frame.

Referring to FIG. 3, in Step 302, the base QP value (determined in step 204 of FIG. 2) and number of macroblocks for the video frame is received. In step 304, n is set to equal zero. In one or more embodiments of the invention, n represents a counter in integer format. The counter may represent a number assigned to a macroblock within a video frame. When n=0, the counter may be initialized. In step 306, the ΔQP value, prediction mode, and reference vector for the $n^{th}$ macroblock is received from the encoder.

In step 308, the reference block is determined using the reference vector and prediction mode for the $n^{th}$ macroblock. The reference block is described above with respect to FIG. 2. In step 310, a reconstructed predicted QP value for the $n^{th}$ macroblock is determined using the prediction mode, reference block for the $n^{th}$ macroblock, and the base QP value for the video frame. In one or more embodiments of the invention, the inverse of the algorithm described below with respect to FIG. 4 is used to determine the reconstructed predicted QP value for the $n^{th}$ macroblock.

In step 312, a reconstructed actual QP value for the $n^{th}$ macroblock is calculated by adding the reconstructed predicted QP value and the ΔQP value for the $n^{th}$ macroblock. In step 314, a reconstructed video frame is generated based on the reconstructed actual QP value for the $n^{th}$ macroblock.

In step 316, n is set to equal n+1. In other words, the counter described above with respect to step 304 in incremented by one. In step 318, a determination is made as to whether n is less than the number of macroblocks in the video frame, as described above with respect to step 302. If n is less than the number of macroblocks in the video frame, then the process reverts to step 306, where the ΔQP value, prediction mode, and reference vector for the $n^{th}$ macroblock is received from the encoder. If n is not less than (i.e., n equals or exceeds) the number of macroblocks in the video frame, then the process proceeds to step 320. In step 320, the reconstructed video frame is sent to a media receiver.

FIG. 4 shows a flowchart of the QP prediction algorithm in accordance with one or more embodiments of the invention. Specifically, in one or more embodiments of the invention, FIG. 4 provides additional detail for step 216 in FIG. 2 above. While the various steps in this flowchart are presented and described sequentially, one of ordinary skill will appreciate that some or all of the steps may be executed in different orders, may be combined, or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that other steps, omitted in FIG. 4, may be included in this flowchart. Accordingly, the specific arrangement of steps shown in FIG. 4 should not be construed as limiting the scope of the invention. Further, in one or more embodiments of the invention, a particular computing device, as described, for example, in FIG. 10 below, is used to perform one or more of the steps in FIG. 4.

Referring to FIG. 4, in Step 402, an actual QP value for the $n^{th}$ macroblock is received. In step 404, a determination is made as to whether there is a reference block. If there is a reference block, then the process proceeds to step 414. If there is not a reference block, then the process proceeds to step 406.

In step 406, a determination is made as to whether there are adjacent macroblocks with actual QP values that have been determined. In one or more embodiments of the invention, the macroblocks are scanned (i.e., assigned actual QP values and predicted QP values) moving from the left-most column to the right-most column, starting with the top row and traversing to the bottom row. Alternatively, the macroblocks may be scanned in any other order, whether systematic or random. If there are adjacent macroblocks with actual QP values that have been determined, then the process proceeds to step 410, where the predicted QP value of the $n^{th}$ macroblock is calculated as the simple average of the actual QP values of the adjacent macroblocks whose actual QP values have been determined.

Continuing with Step 406, if there no are adjacent macroblocks with actual QP values that have been determined, then the process proceeds to step 408, where the predicted QP value of the $n^{th}$ macroblock is set equal to the base QP value of the video frame. The process then proceeds to step 412, as described above.

In step 414, a reference block is received. Optionally, if the reference block is located on a different frame than the current frame containing the $n^{th}$ macroblock, then an offset may be calculated as the difference between the base QP of the frame containing the $n^{th}$ macroblock and the base QP of the frame containing the reference block.

In step 416, a determination is made as to whether the reference block overlaps more than one macroblock. If the reference block only overlaps one macroblock, then the process proceeds to step 418, where the predicted QP value of the $n^{th}$ macroblock is equal to the actual QP value of the reference block. Optionally, if the reference block is located on a different frame than the current frame containing the $n^{th}$ macroblock, then the offset, discussed above, may be added to the actual QP value of the reference block to determine the predicted QP value of the $n^{th}$ macroblock. Once the predicted QP value of the $n^{th}$ macroblock has been determined in step 418, then the process then proceeds to step 412, as described above.

Continuing with step 416, if the reference block does overlap more than one macroblock, then the process proceeds to step 420. In Step 420, the predicted QP value of the $n^{th}$ macroblock is calculated as the weighted average of the actual QP value for each macroblock that overlaps the reference block. Optionally, if the reference block is located on a different frame than the current frame containing the $n^{th}$ macroblock, then the offset (discussed above) may be used to adjust the predicted QP value of the $n^{th}$ macroblock. A detailed example of step 420, including the optional case, is discussed below with respect to FIGS. 9A and 9B. Once the predicted QP value of the $n^{th}$ macroblock has been determined in step 420, the process then proceeds to step 412, as described above.

In one or more embodiments of the invention, the methods described in FIGS. 2-4 above may be implemented in a media stack within an operating system of a computer or another device capable of generating and sending encoded data or receiving and decoding data. For example, the encoding and decoding process described above may be used in a media stack executing on one or more of the components shown or described with respect to FIG. 1. One example of the media stack is the Open Media Stack (OMS) encoder, which includes a video specification that defines a video encoder/decoder and the associated bit stream syntax. OMS is intended for delivery, storage, and playback of video streams.

The following describes some examples in accordance with one or more embodiments of the invention. The examples are for explanatory purposes only and are not intended to limit the scope of the invention. Terminology used in FIGS. 1-4 may be used in the examples without further reference to FIGS. 1-4.

EXAMPLE 1

Figure 5:
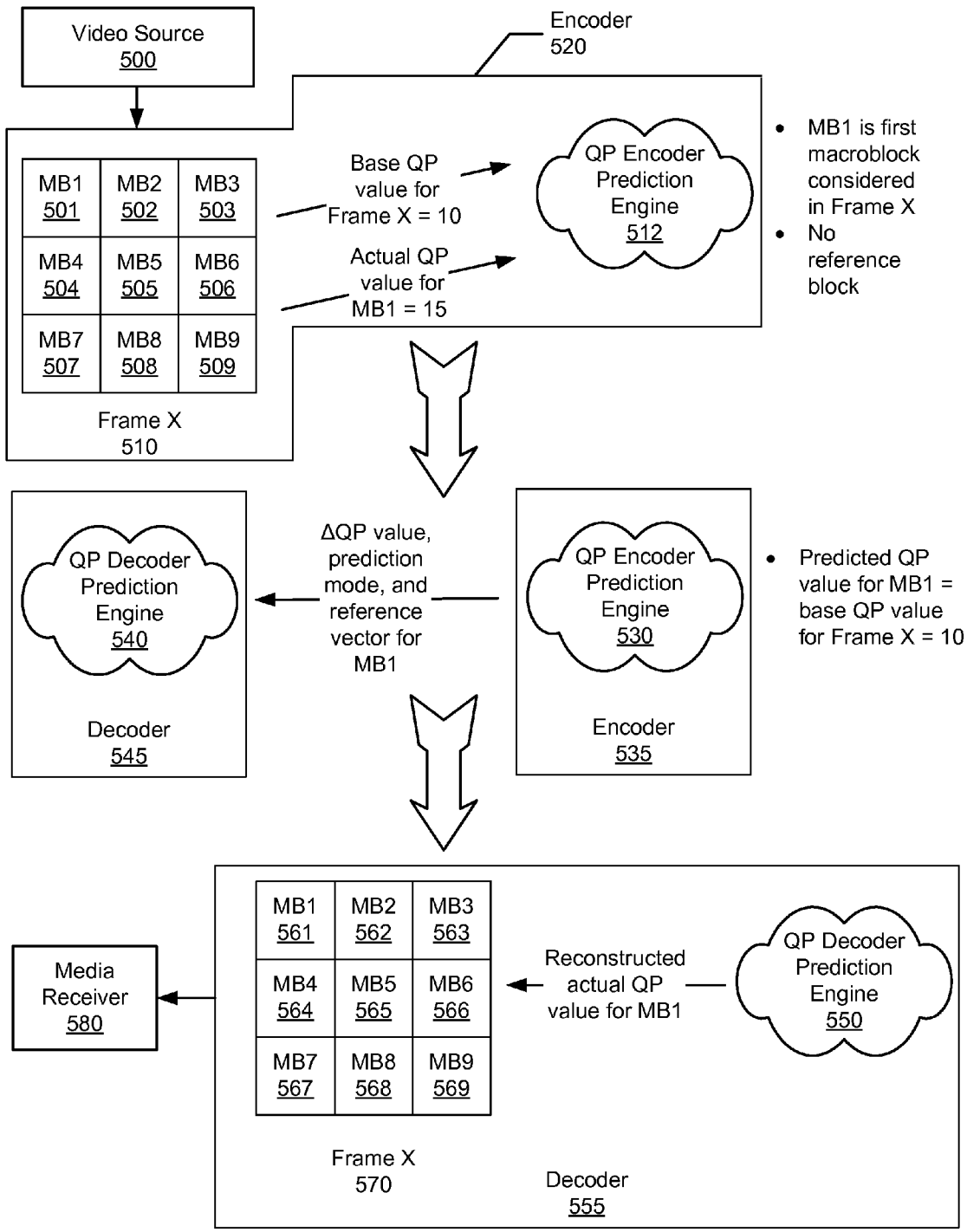
FIGS. 5-9B show examples in accordance with one or more embodiments of the invention.

Consider the following example that describes a method of QP prediction in accordance with one or more embodiments described above. As shown in FIG. 5, video source (500) sends Frame X (510), which includes nine macroblocks, MB1 (501) through MB9 (509) in a 3×3 configuration. Initially, a base QP value for a frame is determined. The determination of macroblocks and base QP value for a frame may be made by the encoder. In this example, the base QP value for Frame X (510) is 10. Each of the macroblocks (MB1 (501)-(509)) has an actual QP value, which is sent to the QP encoder prediction engine (512) one at a time (however, they may also be sent in groups of two or more). The order in which the actual QP value of each of the macroblocks is sent may vary, depending on the algorithm used by the encoder. For example, the macroblock in the upper left of the frame (MB1 (501) of Frame X (510) in this example) may be the first to be sent to the QP encoder prediction engine (512) of the encoder (520).

When no reference block exists for a current macroblock, the prediction mode is set to spatial (i.e., only the current frame, and not a previous frame, is considered when determining a predicted QP value for a macroblock of the frame). In this example, there is no reference block for the current macroblock (MB1 (501)). When the macroblock being considered is the first macroblock in a frame and there is no reference block, the predicted QP value of the macroblock is equal to the base QP macroblock of the frame. Here, macroblock MB1 (501) is the first of the macroblocks in Frame X (510) and there is no reference block, accordingly the predicted QP value of MB1 (501) is equal to the base QP value of Frame X (510), which is equal to 10.

Continuing with Example 1, when the QP encoder prediction engine receives the actual QP value and determines the predicted QP value for the macroblock, the QP encoder prediction engine calculates a ΔQP value for the macroblock by subtracting the predicted QP value from the actual QP value. In this example, the QP encoder prediction engine (530) receives the actual QP value for the macroblock (i.e., the base QP value for Frame X (510)) from the encoder (535) and determines the predicted QP value for the macroblock. The QP encoder prediction engine (530) then calculates a ΔQP value for the macroblock by subtracting the predicted QP value for the macroblock (i.e., 10) from the actual QP value for the macroblock (i.e., 15). The encoder then sends the ΔQP value, the prediction mode, and the reference vector for the macroblock to the decoder, which uses the QP decoder prediction engine to determine a reconstructed predicted QP value for the macroblock. In this example, the encoder (535) sends the following information to the decoder for MB1: ΔQP=5; there is no reference block; the prediction mode is spatial (this may be inferred by the decoder based of the fact that there is no reference block—if this is the case, then the prediction mode may not need to be sent to the decoder).

In the final step of this example, once the decoder (555) receives the ΔQP value, the prediction mode (optional), and the reference vector for the macroblock from the encoder, the QP decoder prediction engine (550) determines a reconstructed actual QP value for the macroblock. After the reconstructed actual QP value for the macroblock (MB1 (561)) is determined, a reconstructed video frame is generated based on the reconstructed actual QP value for macroblock MB1 (561) and sent to a media receiver (580).

EXAMPLE 2

Figure 6:
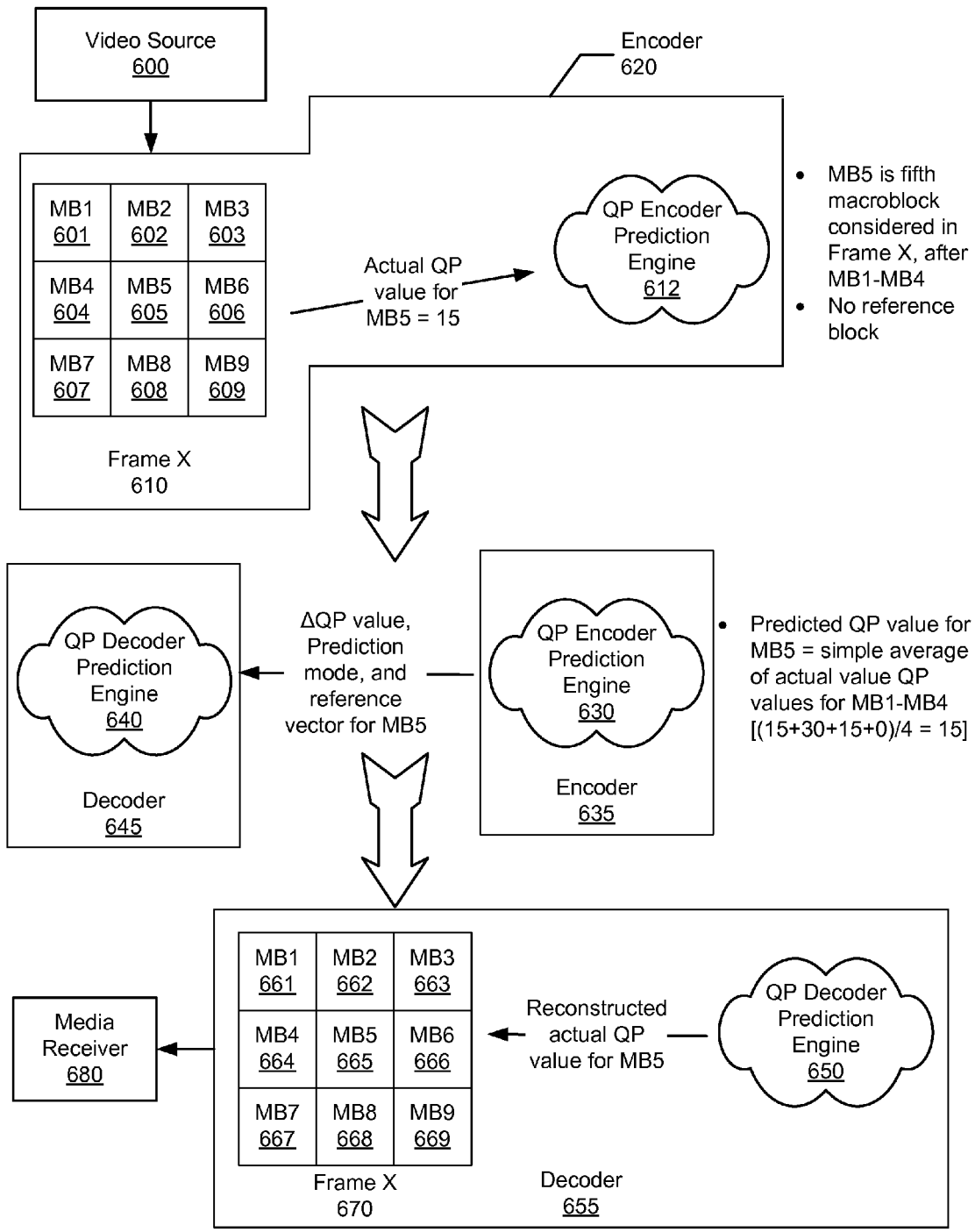

Consider a scenario similar to Example 1, except that the actual QP value for four macroblocks (MB1 (601)-MB4 (604)) have been received. Referring to FIG. 6, encoder (620) has processed macroblocks MB1 (601) through MB4 (604) of Frame X (610). For purposes of illustration, assume that the actual QP value for MB1 (601) is 15, the actual QP value for MB2 (602) is 30, the actual QP value for MB1 (603) is 15, and the actual QP value for MB1 (604) is 0. As in Example 1, there is no reference block for MB5 (605).

When the actual QP value for other macroblocks and the current macroblock in a frame has been received, as well as confirmation that there is no reference block, the predicted QP value of the current macroblock is calculated as the simple average of the actual QP values of all macroblocks that are adjacent to the current macroblock. In this example, the predicted QP value for MB5 (605) is determined using the adjacent to macroblocks (i.e., MB1 (601)-MB4 (604)) and macroblocks MB6 (606) through MB9 (609), but only macroblocks MB1 (601) through MB4 (604) have actual QP values that have been determined at this point in time. As a result, the predicted QP value of MB5 (605) is calculated by the QP encoder prediction engine (630) as the simple average of the actual QP value of MB1 (601) through MB4 (604). In this example, the predicted QP value of MB5 (605) is the simple average of 15, 30, 15, and zero, which equals 15. The predicted QP value of MB5 (605) is then sent to the encoder (635).

The rest of the process in this Example 2 is substantially similar to the process described above with respect to Example 1.

EXAMPLE 3

Figure 7:
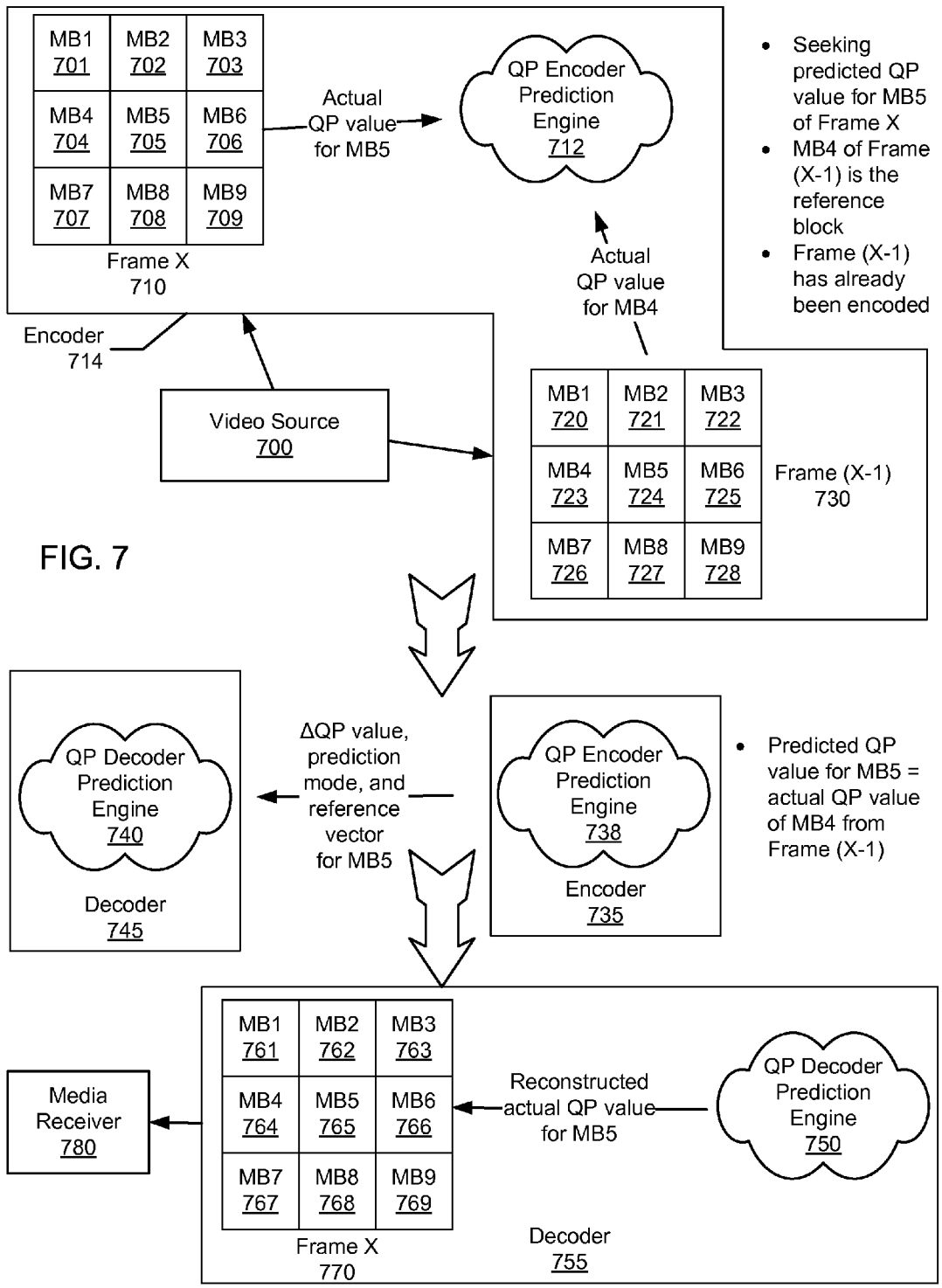

Consider a scenario where a reference block is available and the prediction mode is motion (as opposed to spatial). Referring to FIG. 7, the first portion of FIG. 7, shows a previous frame (Frame (X−1) (730)) with nine macroblocks (MB1 (720)-MB9 (728)) in a 3×3 configuration. Because Frame (X−1) (730) is a previous frame, all macroblocks have already been processed. The first portion of FIG. 7 also shows a current frame (Frame X (710)) with nine macroblocks (MB1 (701)-MB9 (709)) in a 3×3 configuration. The encoder (714), which includes a QP encoder prediction engine (712), determines that the reference block for MB5 (705) is macroblock MB4 (723) of Frame (X−1) (730).

When there is a reference block and the prediction mode is motion, the predicted QP value for the current macroblock is equal to the actual QP value of the reference block. In this example, the QP encoder prediction engine (712) of the encoder (714) determines that the predicted QP value for macroblock MB5 (705) of Frame X (710) is equal to the actual QP value for macroblock MB4 (723) of Frame (X−1) (730). The ΔQP value for macroblock MB5 (705) of Frame X (710) is then sent to the encoder (735). The rest of the process in this Example 3 is substantially similar to the process described above with respect to Examples 1 and 2.

EXAMPLE 4

Figure 8:
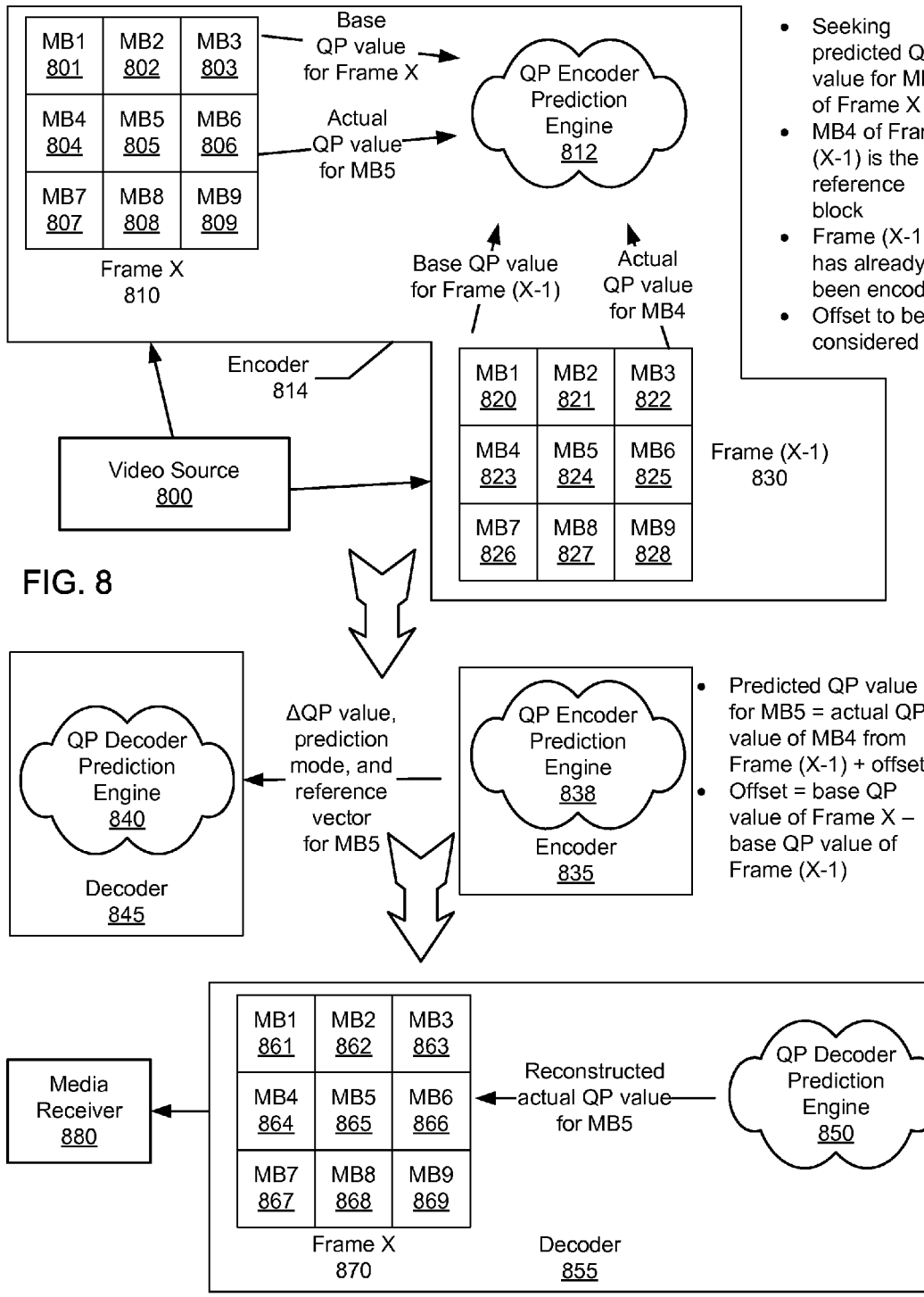

Consider a scenario similar to Example 3, where a reference block is available and the prediction mode is motion (as opposed to spatial). In addition, Example 4 integrates an offset. The first portion of FIG. 8, shows a previous frame (Frame (X−1) (832)) with nine macroblocks (MB1 (820)-MB9 (828)) in a 3×3 configuration. Because Frame (X−1) (830) is a previous frame, all macroblocks have already been processed; accordingly the actual QP value for each macroblock and the base QP value for Frame (X−1) (830) have already been determined. The first portion of FIG. 8 also shows a current frame (Frame X (810)) with nine macroblocks (MB1 (801)-MB9 (809)) in a 3×3 configuration. The encoder (814), which includes a QP encoder prediction engine (812), determines that the reference block for MB5 (805) of Frame X (810) is macroblock MB4 (823) of Frame (X−1) (830). Because the reference block is located on another frame, the prediction mode is motion.

When an offset is considered and the prediction mode is motion, the offset is the difference between the base QP value of the current frame and the base QP value of the frame including the reference block. In this example, the offset is equal to the difference between the base QP value of Frame X (810) and the base QP value of Frame (X−1) (830), which contains macroblock MB4 (823). For purposes of illustration, assume that the base QP value of Frame X (810) is 15 and the base QP value of Frame (X−1) (830) is 10, accordingly the offset equals 5. The QP encoder prediction engine then adds the offset to the actual QP value for the reference block to determine the predicted QP value for the macroblock. In this example, the QP encoder prediction engine (812) adds the offset (5) to the actual QP value for reference block MB4 (823) (assumed to be zero in this example) to calculate that the predicted QP value for macroblock MB5 (805) is 5. The rest of the process in this Example 4 is substantially similar to the process described above with respect to Examples 1-3.

EXAMPLE 5

Figure 9A:
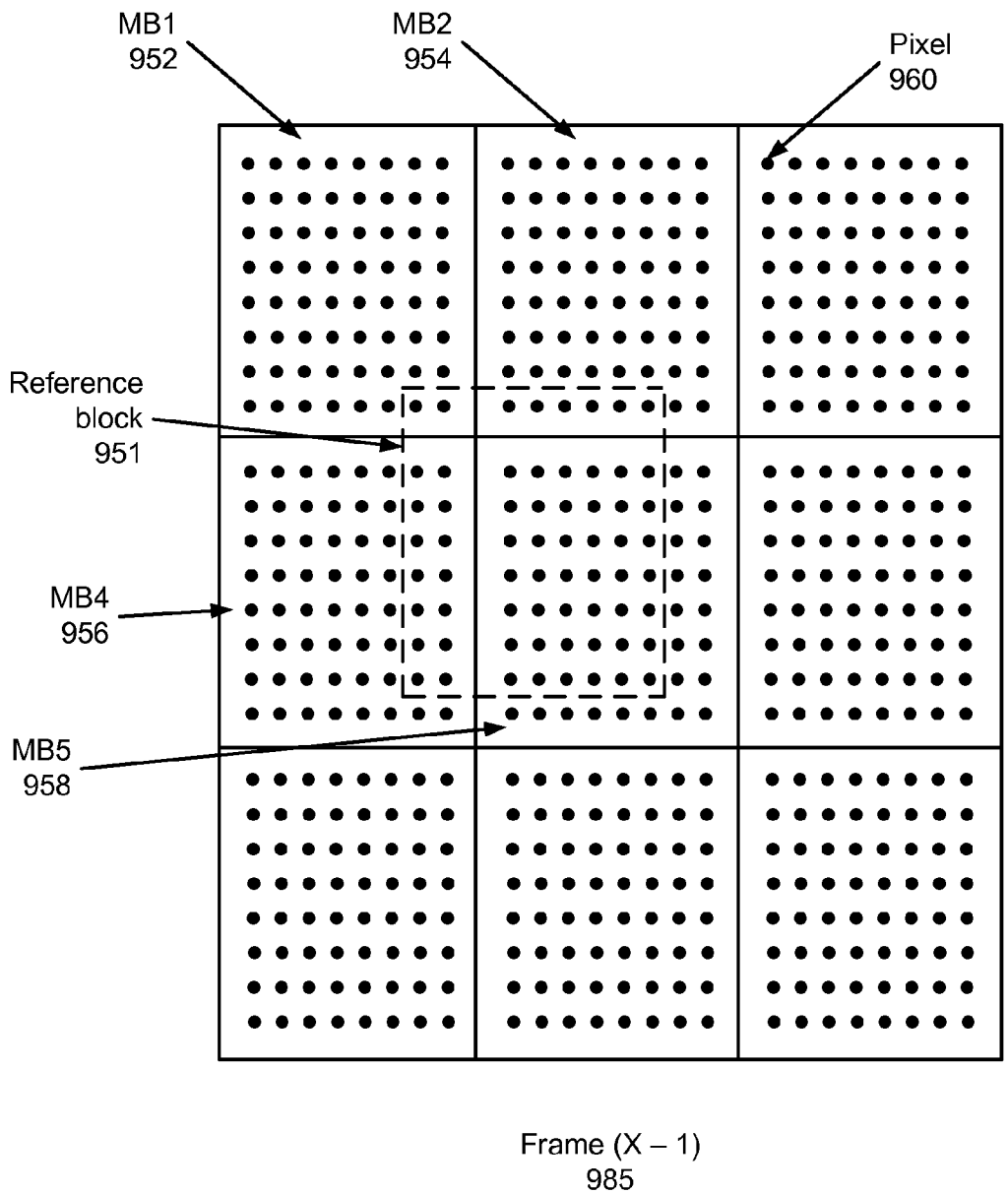
Figure 9B:
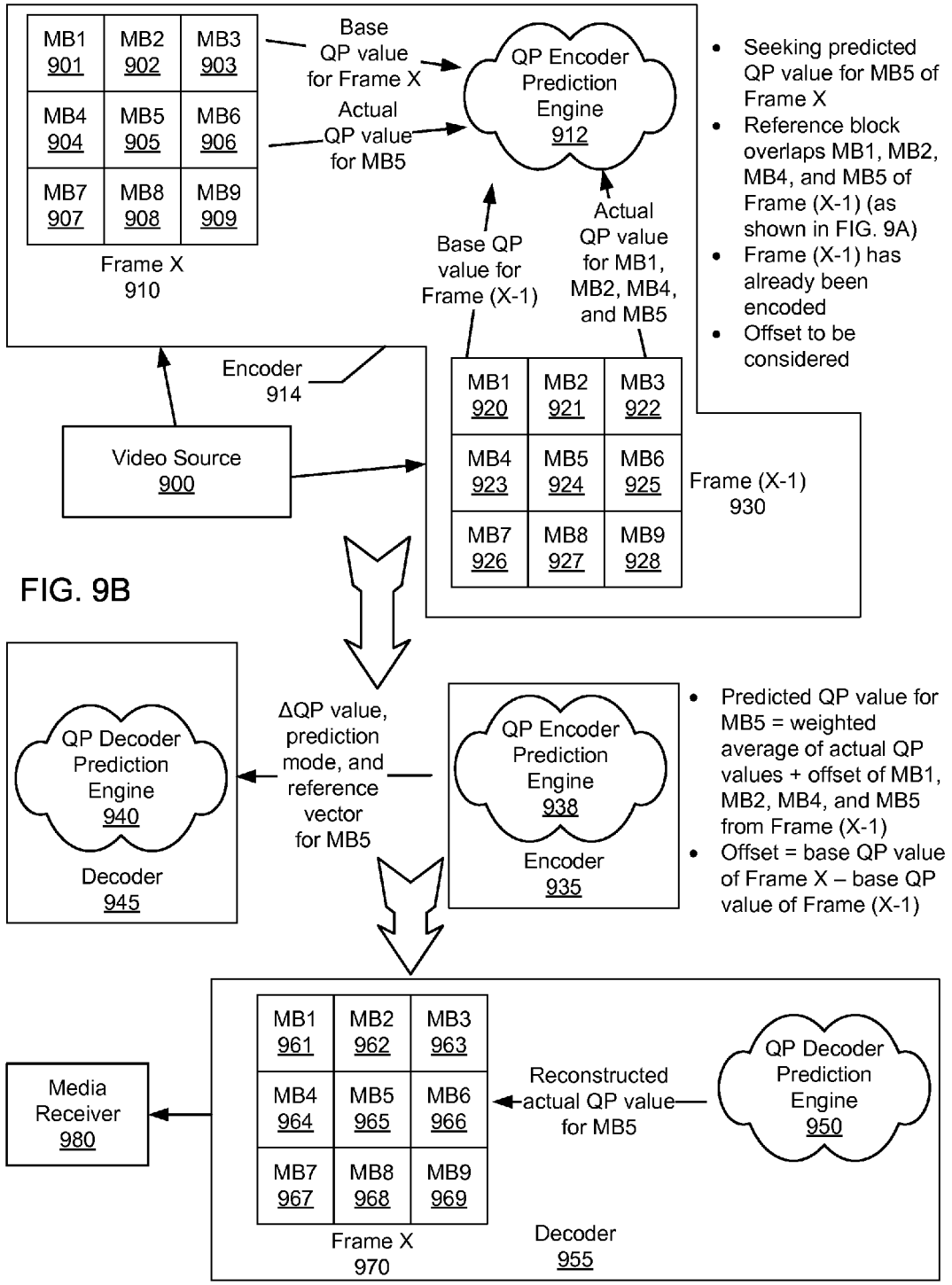

Referring to FIGS. 9A and 9B, consider a scenario similar to Example 4, where a reference block is available, the prediction mode is motion (as opposed to spatial), and an offset is used. In addition, Example 5 considers the case where the reference block overlaps more than one macroblock. FIG. 9A shows an example of a reference block (951) intersecting a portion of four different macroblocks (MB1 (952), MB2 (954), MB4 (956), and MB5 (958)) in Frame (X−1) (985). Each macroblock contains an 8×8 configuration of pixels (e.g., 960). In this example, the reference block (950) intersects two pixels (e.g., 960) in macroblock MB1 (952), six pixels (e.g., 960) in macroblock MB2 (954), fourteen pixels (e.g., 960) in macroblock MB4 (956), and forty two pixels (e.g., 960) in macroblock MB5 (958). If there is no offset to consider, the predicted QP value of the macroblock equals the actual QP value of the reference block, which is calculated as the weighted average of the portions of the macroblocks that intersect the reference block. Specifically, the weight of each macroblock that overlaps the reference block is (number of pixels in overlap space×actual QP value of macroblock)/total number of pixels in reference block. The actual QP value of the reference block is the sum of the weight of each of the macroblocks that overlap the reference block.

In this example, for Frame (X−1) (985), the actual QP value of MB1 (952) is 15, the actual QP value of MB2 (954) is 20, the actual QP value of MB4 (956) is 10, and the actual QP value of MB5 (958) is 15. The weight of MB1 (952) is (2×15)/64; the weight of MB2 (954) is (6×20)/64; the weight of MB4 (956) is (14×10)/64; and the weight of MB5 (958) is (42×15)/64. Thus, the actual QP value of the reference block is 14.375. As discussed above, the actual QP value of the reference block may be used as a real number, or it may be altered in some way, including but not limited to truncation, rounding, or some other suitable alteration.

When considering an offset, the calculation for which is described above with respect to Example 4, the weight of each macroblock that overlaps the reference block is [(number of pixels in overlap space)×(actual QP value of macroblock+offset)]/total number of pixels in reference block. For example, if the offset is 5, then the weight of MB1 (952) is [2×(15+5)]/64; the weight of MB2 (954) is [6×(20+5)]/64; the weight of MB4 (956) is [14×(10+5)]/64; and the weight of MB5 (958) is [42×(15+5)]/64. Thus, the actual QP value of the reference block is 19.375. More simply, when an offset is considered, the offset is added to the actual QP value of the reference block to determine the predicted QP value of the macroblock.

Frame (X−1) (985) in FIG. 9A corresponds to Frame (X−1) (930) in FIG. 9B. Likewise, the macroblocks in FIG. 9A correspond to the macroblocks in FIG. 9B. For example, MB1 (952) in FIG. 9A correspond to macroblock MB1 (920) in FIG. 9B. The first portion of FIG. 9B also shows a current frame (Frame X (910)) with nine macroblocks (MB1 (901)-MB9 (909)) in a 3×3 configuration. The encoder (914), which includes a QP encoder prediction engine (912), determines that the reference block for MB5 (905) of Frame X (910) is reference block (951), calculated as the weighted average of macroblocks MB1 (952), MB2 (954), MB4 (956), and MB5 (958) of Frame (X−1) (985), as described above with respect to FIG. 9A. Because the reference block is located on another frame, the prediction mode is motion.

As described above with respect to Example 4, when an offset is considered and the prediction mode is motion, the offset is the difference between the base QP value of the current frame and the base QP value of the frame including the reference block. In this example, the offset is equal to the difference between the base QP value of Frame X (910) and the base QP value of Frame (X−1) (930), which contains the reference block (951) of FIG. 9A. For purposes of illustration, assume that the base QP value of Frame X (910) is 15 and the base QP value of Frame (X−1) (930) is 10, accordingly the offset equals 5. The QP encoder prediction engine then adds the offset to the actual QP value for the reference block to determine the predicted QP value for the macroblock. In this example, the QP encoder prediction engine (912) adds the offset (5) to the actual QP value for the reference block (951) of FIG. 9A (previously calculated as 14 (truncated) in this example) to calculate that the predicted QP value for macroblock MB5 (905) is 19. The rest of the process in this Example 5, as shown in FIG. 9B, is substantially similar to the process described above with respect to Examples 1-4.

Experimental data generated when using one or more embodiments of the invention shows that embodiments of the invention may result in a significant reduction in the number of bits needed relative to known QP prediction protocols. For example, using three different video sequences, the embodiments of the invention used between 33% and 39% fewer bits relative to known QP prediction protocols. Such reduction of bits may result in a significant reduction in bandwidth required to transmit encoded and decoded data.

Figure 10:
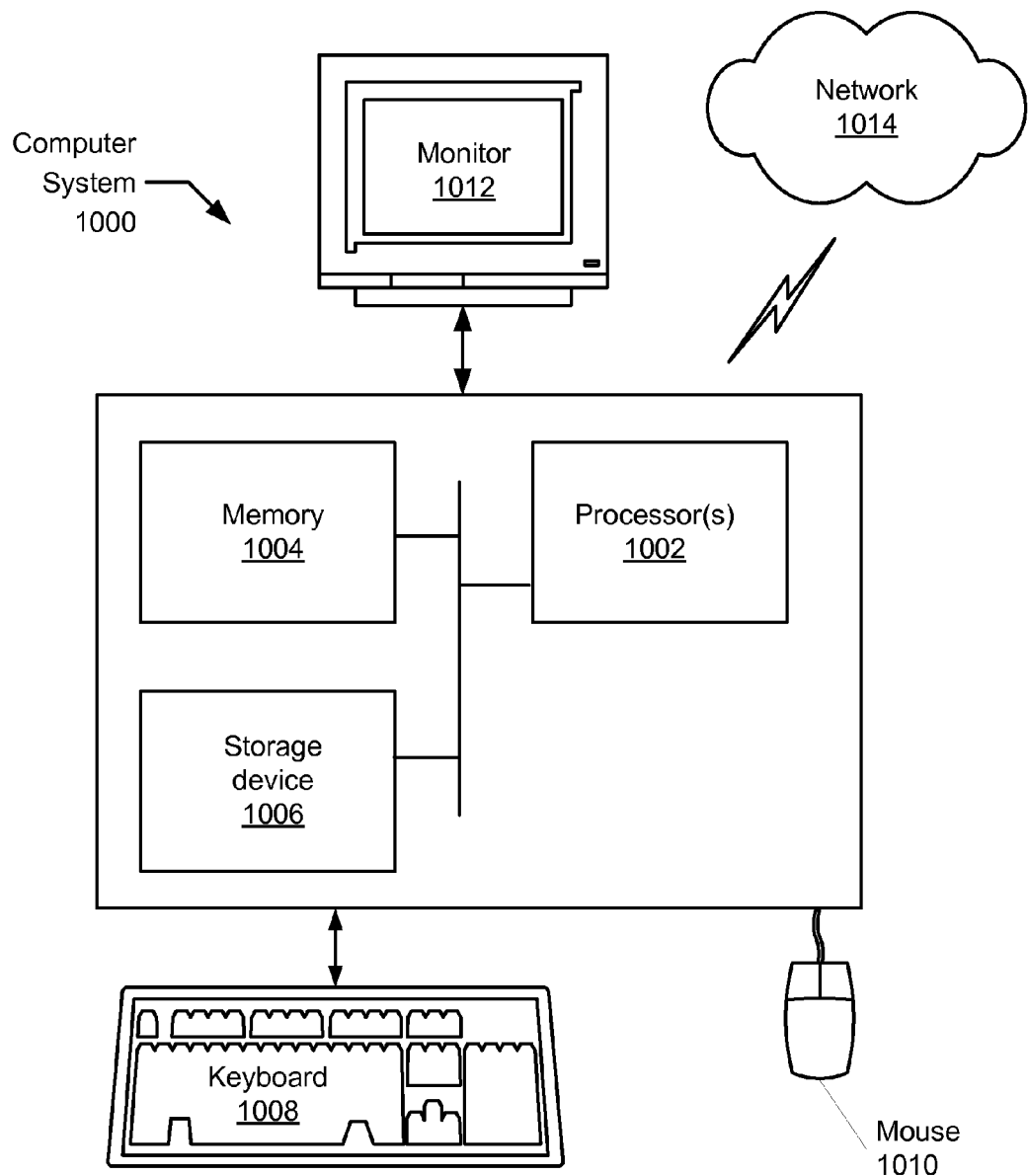
FIG. 10 shows a computer system in accordance with one or more embodiments of the invention.

Embodiments of the invention may be implemented on virtually any type of computer regardless of the platform being used. For example, as shown in FIG. 10, a computer system (1000) includes one or more processor(s) (1002), associated memory (1004) (e.g., random access memory (RAM), cache memory, flash memory, etc.), a storage device (1006) (e.g., a hard disk, an optical drive such as a compact disk drive or digital video disk (DVD) drive, a flash memory stick, etc.), and numerous other elements and functionalities typical of today's computers (not shown). The computer (1000) may also include input means, such as a keyboard (1008), a mouse (1010), or a microphone (not shown). Further, the computer (1000) may include output means, such as a monitor (1012) (e.g., a liquid crystal display (LCD), a plasma display, or cathode ray tube (CRT) monitor). The computer system (1000) may be connected to a network (1014) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (1000) includes at least the minimal processing, input, and/or output means necessary to practice embodiments of the invention.

Further, those skilled in the art will appreciate that one or more elements of the aforementioned computer system (1000) may be located at a remote location and connected to the other elements over a network. Further, embodiments of the invention may be implemented on a distributed system having a plurality of nodes, where each portion of the invention (e.g., data compression module, data decompression module) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions executable by a processor to perform a method, the method comprising:
    obtaining a current frame from a video stream, wherein the video stream comprises a plurality of frames;
    determining a first base QP value for the current frame;
    sending the first base QP value for the current frame to a decoder;
    obtaining a first macroblock from the current frame, wherein the first macroblock comprises a first image on the current frame;
    determining a first actual quantization parameter (QP) value for the first macroblock;
    determining a first reference block for the first macroblock;
    determining a first predicted QP value for the first macroblock using the first reference block;
    calculating a first ΔQP value for the first macroblock as a difference between the first actual QP value and the first predicted QP value; and
    sending the first ΔQP value, a first prediction mode, and a first reference vector to the decoder, wherein the first prediction mode indicates a frame of the plurality of frames on which the first reference block resides, and wherein the first reference vector discloses a location of the first reference block on the frame.

2. The non-transitory computer readable medium of claim 1, wherein the location of the first reference block is a second macroblock from the current frame, wherein the second macroblock is associated with a second actual QP value.

3. The non-transitory computer readable medium of claim 1, the method further comprising:
    obtaining a second macroblock from the current frame, wherein the second macroblock comprises a second image on the current frame;
    based on the determination that the second macroblock does not have a reference block and that there are no macroblocks adjacent to the second macroblock that have an actual QP value, determining that a second predicted QP value for the second macroblock is equal to the first base QP value for the current frame;
    calculating a second ΔQP value for the second macroblock as a difference between a second actual QP value and the second predicted QP value; and
    sending the second ΔQP value, a second prediction mode, and a second reference vector to a decoder, wherein the second prediction mode is spatial, and wherein the second reference vector is a null value.

4. The non-transitory computer readable medium of claim 1, the method further comprising:

obtaining a second macroblock from the current frame, wherein the second macroblock comprises a second image on the current frame;

based on the determination that the second macroblock lacks a reference block and that the first macroblock, a third macroblock, and a fourth macroblock are adjacent to the second macroblock, wherein the third macroblock has a third actual QP value, and the fourth macroblock has a fourth actual QP value:

calculating a second predicted QP value for the second macroblock as a simple average of the first actual QP value, the third actual QP value, and the fourth actual QP value;

calculating a second ΔQP value for the second macroblock as a difference between the second actual QP value and the second predicted QP value; and sending the second ΔQP value, a second prediction mode, and a second reference vector to a decoder, wherein the second prediction mode is spatial, and wherein the second reference vector is a null value.

5. The non-transitory computer readable medium of claim 1, the method further comprising:

calculating the first predicted QP value as a weighted average of a second actual QP value, a third actual QP value, a fourth actual QP value, and a fifth actual QP value based on a portion of a second macroblock, a third macroblock, a fourth macroblock, and a fifth macroblock, each of which overlap the first reference block, wherein the second macroblock has a second actual QP value that has previously been determined and a first number of pixels that overlap the first reference block, wherein the third macroblock has a third actual QP value that has previously been determined and a second number of pixels that overlap the first reference block, wherein the fourth macroblock has a fourth actual QP value that has previously been determined and a third number of pixels that overlap the first reference block, wherein the fifth macroblock has a fifth actual QP value that has previously been determined and a fourth number of pixels that overlap the first reference block, and wherein a number of pixels of the reference block equals the sum of the first number of pixels, the second number of pixels, the third number of pixels, the fourth number of pixels.

6. The non-transitory computer readable medium of claim 5, wherein each of the second macroblock, the third macroblock, the fourth macroblock, and the fifth macroblock is located in a previous frame.

7. The non-transitory computer readable medium of claim 5, wherein each of the second macroblock, the third macroblock, the fourth macroblock, and the fifth macroblock is from the current frame.

8. The non-transitory computer readable medium of claim 1, wherein the location of the first reference block is a second macroblock from a previous frame, wherein the second macroblock is determined to have a second actual QP value, and wherein the previous frame has a second base QP value.

9. The non-transitory computer readable medium of claim 8, wherein the first predicted QP value for the first macroblock is equal to the second actual QP value for the second macroblock on the previous frame.

10. The non-transitory computer readable medium of claim 8, wherein the first predicted QP value for the first macroblock is equal to an offset added to the second actual QP value for the second macroblock on the previous frame, wherein the offset is equal to first base QP value minus the second base QP value.

11. A non-transitory computer readable medium comprising instructions executable by a processor to perform a method, the method comprising:

receiving a base quantization parameter (QP) value for a video frame from an encoder;

receiving a first ΔQP value, a first prediction mode, and a first reference vector for a first macroblock, wherein the first macroblock comprises an image on the video frame, wherein the first prediction mode indicates a video frame on which the first reference block resides, and wherein the first reference vector discloses a location of the first reference block on the video frame on which the reference block resides;

determining a first reference block using the first reference vector and the first prediction mode for the first macroblock;

generating a reconstructed first predicted QP value for the first macroblock using the first prediction mode, the first reference block, and the base QP value for the video frame;

calculating a reconstructed first actual QP value for the first macroblock by adding the reconstructed first predicted QP value and the first ΔQP value;

generating a reconstructed video frame based on the reconstructed first actual QP value; and sending the reconstructed video frame to a media receiver.

12. The non-transitory computer readable medium of claim 11, wherein the first prediction mode is one selected from a group consisting of spatial and motion.

13. A system comprising:

a processor;

a memory;

a video source configured to send a first video frame and a second video frame to an encoder using the processor;

the encoder configured to execute, using the processor, software instructions stored in the memory, to:

receive the first video frame and the second video frame;

determine a base quantization parameter (QP) value for the first video frame;

obtain a first plurality of macroblocks for the first video frame;

determine a first actual QP value for a first macroblock of the first plurality of macroblocks;

determine a first reference block for the first macroblock; and calculate a first ΔQP value for the first macroblock;

a QP encoder prediction engine configured to execute, using the processor, software instructions stored in the memory, to:

receive the first reference block, a first prediction mode, and the first base QP value for the first video frame, and wherein the first prediction mode indicates a frame on which the first reference block resides; and calculate a first predicted QP value for the first macroblock using the first reference block, the first prediction mode, and the first base QP value, wherein the first predicted QP value is subtracted from the first actual QP value to generate the first ΔQP value for the first macroblock.

14. The system of claim 13, wherein:

the encoder is further configured to execute, using the processor, software instructions stored in the memory, to:

obtain a second macroblock from the first video frame, wherein the second macroblock comprises a second image on the first video frame;

the QP encoder prediction engine is further configured to execute, using the processor, software instructions stored in the memory, to:
based on the determination that the second macroblock does not have a reference block and that there are no macroblocks adjacent to the second macroblock that have an actual QP value, determine that a second predicted QP value for the second macroblock is equal to the first base QP value for the first video frame.

15. The system of claim 13, wherein:
the encoder is further configured to execute, using the processor, software instructions stored in the memory, to:
obtain a second macroblock from the first video frame, wherein the second macroblock comprises a second image on the first video frame;
the QP encoder prediction engine is further configured to execute, using the processor, software instructions stored in the memory, to:
based on the determination that the second macroblock lacks a reference block and that the first macroblock, a third macroblock, and a fourth macroblock are adjacent to the second macroblock, wherein the third macroblock has a third actual QP value, and the fourth macroblock has a fourth actual QP value:
calculate a second predicted QP value for the second macroblock as a simple average of the first actual QP value, the third actual QP value, and the fourth actual QP value.

16. The system of claim 13,
wherein the first predicted QP value is calculated as a weighted average of a second actual QP value, a third actual QP value, a fourth actual QP value, and a fifth actual QP value based on a portion of a second macroblock, a third macroblock, a fourth macroblock, and a fifth macroblock, each of which overlap the first reference block,
wherein the second macroblock has a second actual QP value that has previously been determined and a first number of pixels that overlap the first reference block,
wherein the third macroblock has a third actual QP value that has previously been determined and a second number of pixels that overlap the first reference block,
wherein the fourth macroblock has a fourth actual QP value that has previously been determined and a third number of pixels that overlap the first reference block,
wherein the fifth macroblock has a fifth actual QP value that has previously been determined and a fourth number of pixels that overlap the first reference block, and
wherein a number of pixels of the reference block equals the sum of the first number of pixels, the second number of pixels, the third number of pixels, the fourth number of pixels.

17. The system of claim 16, wherein each of the second macroblock, the third macroblock, the fourth macroblock, and the fifth macroblock is from the first video frame.

18. The system of claim 13, wherein the location of the first reference block is a second macroblock from a frame preceding the first video frame, wherein the second macroblock is determined to have a second actual QP value, and wherein the frame preceding the first video frame has a second base QP value.

19. The system of claim 18, wherein the first predicted QP value for the first macroblock is equal to the second actual QP value for the second macroblock on the frame preceding the first video frame.

20. The system of claim 18, wherein the first predicted QP value for the first macroblock is equal to an offset added to the second actual QP value for the second macroblock on the frame preceding the first video frame, wherein the offset is equal to first base QP value minus the second base QP value.

* * * * *